Patented Aug. 11, 1953

2,648,687

UNITED STATES PATENT OFFICE 2,648,687

PROCESS OF PREPARING CHOLESTEROL

La Verne Van Ness, Chicago, Ill., assignor to Armour and Company, Chicago, Ill., a corporation of Illinois No Drawing. Application January 27, 1951, Serial No. 208,227

12 Claims. (Cl. 260—397.2)

This invention relates to processes of preparing cholesterol, and it relates more particularly to processes wherein crude cholesterol is dissolved in an alkali metal hydroxide alcoholic solution and crystallized therefrom in pure form.

The substance cholesterol is obtained from several different sources, such as for example from the nerve tissue found in the brain and spinal cord of animals and also from sources such as fish oil and wool fat. The substance has become of increasing commercial importance in recent years, essentially as an intermediate in the preparation of other valuable products such as the vitamins and related chemicals. Cholesterol contains the basic cholane ring structure and lends itself readily to the synthesis of other compounds containing the cholane ring within their structures.

Various methods have been proposed and used to isolate cholesterol from its different source materials, most of these methods relying on the use of a solvent to extract the cholesterol from the raw material under specified conditions. For example, a process which has been found to be commercially successful is the one set out in the Porsche U. S. Patent No. 2,371,467, which describes a process for isolating cholesterol from animal nerve tissue by extracting cholesterol from the tissue with ethylene dichloride.

However, although the various extracting solvents which have been employed are theoretically specific for cholesterol and for nothing else, it has been found that in commercial operations involving hundreds of pounds of raw material, considerable amounts of impurities have been carried along with the cholesterol, and therefore the cholesterol eventually recovered from the solvent has been of a rather crude nature. Such crude cholesterol may be useful for certain purposes, where the impurities have no adverse effect upon the end product being prepared; but for many applications it is essential that the substance be substantially free of impurities.

United States Pharmacopeia specifications have been established for cholesterol, and in order for a given amount of cholesterol to be termed a U. S. P. product, it must meet such specifications. For example, it must occur as white or faintly yellow, almost odorless, pearly leaflets or granules; it must be insoluble in water and soluble in acetone, hot alcohol, chloroform, ether, ethyl acetate, petroleum benzin, and vegetable oils; it must melt between 147° and 150° C.; and so on. Since these standards are quite high, it is the practice of many purchasers, who require cholesterol in substantially pure form as their raw material, to specify a U. S. P. product in their purchase orders, and therefore U. S. P. cholesterol commands a considerably higher price on the market than do cruder products which fail to meet U. S. P. specifications.

As mentioned, the use of specific solvents to extract cholesterol from its various source materials usually results in the isolation of a rather crude form of cholesterol, and, in view of the above, considerable effort has been directed at the problem of treating the crude material to free it of impurities. The methods resorted to most frequently thus far for accomplishing this have involved recrystallization of the cholesterol from various solvents, such as, for example, recrystallization from alcohol. Since cholesterol is soluble in hot alcohol and relatively insoluble in cold alcohol, there has been a small degree of success in the use of alcohol for recrystallization. However, workers in this field have encountered considerable difficulty in the fact that most of the contaminants in crude cholesterol have solubilities closely paralleling that of cholesterol, when alcohol is involved; and for this reason it has been necessary to employ repeated crystallizations and to use excessive amounts of alcohol in order to obtain a product having the desired characteristics.

An object of the present invention is to provide a simple and consistently succesful process of treating crude cholesterol to render it substantially free of contaminants. Another object of the invention is to provide a process, employing mild conditions and readily available, inexpensive materials, for obtaining a U. S. P. product from crude cholesterol in a single crystallization step. A further object is to provide a process for freeing crude cholesterol of impurities by employing a specific solvent which dissolves both cholesterol and its contaminants when hot but precipitates substantially only the cholesterol when chilled. Further objects of the invention will become apparent as the specification proceeds.

My process comprises dissolving crude cholesterol in an alkali metal hydroxide solution containing at least 85% by volume of alcohol, crystallizing the cholesterol from this solution, and then separating and washing the crystallized cholesterol. The crude cholesterol is preferably dissolved in the solvent by heating until solution takes place, and the subsequent crystallizaing solution. The final steps may comprise washing with separate portions of alcohol and water.

In one specific embodiment of my invention, 24 grams of crude cholesterol cake are mixed with 200 cc. of 3A alcohol (90% ethanol, 5% methanol, and 5% water) containing 2 grams of potassium hydroxide. 2.4 grams of diatomaceous earth filter aid are added, and the material is heated until solution of the cholesterol is effected. The mixture is filtered while hot and then cooled to 29° C. with stirring. The resultant slurry is filtered by means of a basket centrifuge, washed with alcohol followed by washing with water, then with a small amount of 3A alcohol and dried at 70° C. in vacuo. The resultant pure cholesterol meets all U. S. P. specifications.

As mentioned previously, pure or aqueous alcohol has been only partially successful for the recrystallization of cholesterol, because of the fact that, although both cholesterol and its contaminants are soluble in hot alcohol, they are both also relatively insoluble in cold alcohol, and therefore chilling of the solution has little effect in separating the two components. On the other hand, by the present invention it appears that an aqueous alkali metal hydroxide solution containing large amounts of alcohol (i. e., at least 85% by volume of alcohol) has the unique property of dissolving both cholesterol and its contaminants when hot but of throwing down only the cholesterol in substantially pure form when chilled. Application of this invention to the problem of purifying crude cholesterol results in a process which is consistently successful in obtaining a U. S. P. product.

It also appears that the objects of the invention are readily achieved by the use of relatively mild conditions. That is, there is no need to saponify the contaminants by boiling the crude cholesterol for hours before the chilling step. The mixture need be heated only until solution of the crude cholesterol occurs, and then the heating may be immediately discontinued. It is apparent that, under any ordinary circumstances, solution takes place before boiling occurs, and it is an advantage of my invention therefore that the complete process may be operated without any necessity for saponification or excessive boiling of the substances present in the mixture.

In the practice of my invention, the first step comprises dissolving the crude cholesterol in the solvent. This solvent is prepared by dissolving the proper amount of alkali metal hydroxide in an aqueous alcohol solution containing at least 85% by volume of alcohol. The alcohol may be of any suitable type and is preferably an alcohol having from 1 to 4 carbon atoms in an aliphatic chain thereof, or it may be a mixture of such alcohols. It is possible to use a pure alcohol and dilute this with sufficient water to cause solution of the alkali metal hydroxide, but ordinarily it is more economical to use a denatured alcohol. One such denatured alcohol of commerce consists of 90 percent ethyl alcohol, 5 percent methyl alcohol and 5 percent water, and this has been found to contain the proper proportions of alcohol and water to function quite satisfactorily in my process.

With reference to the alkali metal hydroxide which is dissolved in the above aqueous alcohol, it has been found that potassium hydroxide is particularly suitable since it is readily available, economical, and dissolves comparatively easily in aqueous alcoholic solutions. However, other alkali metal hydroxides such as, for example, sodium hydroxide and lithium hydroxide may also be used. The amount of such hydroxide in the alcoholic solution should preferably be within the range of 0.5% to 10.0%, by weight, and optimum results are found to be obtained when 0.5% to 1.0% of the hydroxide is used.

In carrying out my process, the crude cholesterol is dissolved in the alkali metal hydroxide solvent thus prepared, and this may be accomplished merely by mixing the crude material with the solvent and heating the mixture until solution occurs. It has been found that solution ordinarily takes place before the boiling point of the solvent is reached and that actual boiling of the mixture is not required. Immediately upon solution of the crude cholesterol, the solution may be filtered, and then cholesterol is crystallized from the solution in substantially pure form, preferably by placing the cholesterol-containing solution in a jacketed tank, and agitating and cooling the solution until crystallization temperature is reached. During this time the alkali metal hydroxide alcoholic solvent exerts its specific influence and throws down substantially all the dissolved cholesterol while retaining in solution the bulk of the contaminants. The appropriate temperature for the chilling operation varies depending upon the type of alcohol being used in the solvent, but generally good results are obtained when the mixture is maintained at temperatures of from 20° C. to 38° C.

The crystallization of cholesterol results in a slurry, from which the cholesterol may be separated by any well-known means, such as for example by means of a basket centrifuge. It has been found that small amounts of certain salts and other impurities, even though soluble in the solvent, are carried down physically with the crystallized cholesterol, and further important results are obtained in the process of my invention if the separated cholesterol is washed with separate portions of alcohol and water to free the cholesterol of these last small traces of contaminants.

Thus, starting with a crude cholesterol which has been extracted from animal nerve tissue, fish oil, or other material rich in cholesterol, I am able consistently by means of a process involving a single crystallization step to obtain cholesterol which has a melting point within the range between 147° and 150° C. and which meets U. S. P. specifications in all other respects.

Specific examples showing the manner in which my invention may be carried out are given as follows:

*Example 1*

Twenty-four grams of crude cholesterol cake having a melting point of 134.6°–142.1° C. were dissolved in 200 cc. of 3A alcohol containing 0.2 gram (0.1%) of potassium hydroxide. 2.4 grams of diatomaceous earth filter aid were added, the material was heated until solution of the cholesterol was effected, the material was filtered while hot and then cooled to 29° C. while being stirred. The resultant slurry was filtered with the aid of a basket centrifuge, washed with small amounts of 3A alcohol, washed well with water, then with a small amount of 3A alcohol, and dried at 60° C. under vacuum. The resultant cholesterol was stable in alcohol, soluble in ether and had a melting point of 144.6°–147.2° C.

Example 2

Twenty-four grams of crude cholesterol cake having a M. P. of 134.6°–142.1° C. were dissolved in 200 cc. of 3A alcohol containing 1.0 gram (0.5%) of KOH. It was further treated as in Example 1. The resultant cholesterol was stable in alcohol, soluble in ether and had a M. P. of 148.2°–149° C.

Example 3

Twenty-four grams of crude cholesterol cake having a M. P. of 134.6°–142.1° C. were dissolved in 200 cc. of 3A alcohol containing 2.0 grams (1.0%) of KOH. It was treated further as above. The resultant cholesterol was stable in alcohol, soluble in ether, and had a M. P. of 148.4°–149.2° C.

Example 4

Twenty-four grams of crude cholesterol cake having a M. P. of 134.6°–142.1° C. were dissolved in 200 cc. of 3A alcohol containing 10.0 grams (5.0%) of KOH. Further treatment was as above. The resultant cholesterol was stable in alcohol, soluble in ether, and had a M. P. of 148.0°–148.8° C.

Example 5

Twenty-four grams of crude cholesterol cake having a M. P. of 134.6°–142.1° C. were dissolved in 200 cc. of 3A alcohol containing 20 grams (10%) of KOH. Further treatment was as above. The resultant cholesterol was stable in alcohol, soluble in ether, and had a M. P. of 148.0°–148.8° C.

Example 6

Twenty-four grams of crude cholesterol cake having a M. P. of 134.6°–142.1° C. were dissolved in 200 cc. of 3A alcohol containing 0.2 gram (0.1%) of sodium hydroxide. Further treatment was as above. The resultant cholesterol was stable in alcohol, soluble in ether, and had a M. P. of 145.5°–147.4° C.

Example 7

Twenty-four grams of crude cholesterol cake having a M. P. of 134.6°–142.1° C. were dissolved in 200 cc. of 3A alcohol containing a 1.0 gram (0.5%) of NaOH. Further treatment was as above. The resultant cholesterol was stable in alcohol, soluble in ether, and had a M. P. of 147.6°–148.6° C.

Example 8

Twenty-four grams of crude cholesterol cake having a M. P. of 134.6°–142.1° C. were dissolved in 200 cc. of 3A alcohol containing 2.0 grams (1.0%) of NaOH. Further treatment was as above. The resultant cholesterol was stable in alcohol, substantially soluble in ether and had a M. P. of 147.1°–148.4° C.

Example 9

Twenty-four grams of crude cholesterol cake having a M. P. of 134.6°–142.1° C. were dissolved in 200 cc. of 3A alcohol containing 10.0 grams (5.0%) of NaOH. Further treatment was as above. The resultant cholesterol was stable in alcohol, substantially soluble in ether, and had a M. P. of 147.0°–148.2° C.

Example 10

Twenty-four grams of crude cholesterol cake having a M. P. of 134.6°–142.1° C. were dissolved in 200 cc. of 3A alcohol containing 20.0 grams (10.0%) of NaOH. Further treatment was as above. The resultant cholesterol was stable in alcohol, substantially soluble in ether, and had a M. P. of 147.0°–148.4° C.

Example 11

Twenty-four grams of crude cholesterol cake having a M. P. of 134.6°–142.1° C. were dissolved in 200 cc. of 95% ethanol containing 2.0 grams (1.0%) KOH. Further treatment was as described in Example 1 with the exception that 95% ethanol was used in the step of washing the slurry with alcohol. The resultant cholesterol was stable in alcohol, soluble in ether, and had a M. P. of 147.8°–149.2° C.

Example 12

Twenty-four grams of crude cholesterol cake having a M. P. of 134.6°–142.1° C. were dissolved in 200 cc. of 95% ethanol containing 1.0 gram (0.5%) of NaOH. Further treatment was as described in Example 1 with the exception that 95% ethanol was used in the step of washing the slurry with alcohol. The resultant cholesterol was stable in alcohol, soluble in ether, and had a M. P. of 147.8°–149.2° C.

Example 13

Twenty-four grams of crude cholesterol cake having a M. P. of 134.6°–142.1° C. were dissolved in 200 cc. of 95% butanol containing 2.0 grams (1.0%) of KOH. The material was treated in the usual manner but upon cooling to 29° C. was then concentrated to 75% of the original volume, cooled and the resultant cholesterol centrifuged. The cholesterol was washed with small amounts of butanol and then washed with water. The resultant cholesterol was stable in alcohol, soluble in ether, and had a M. P. of 148.0°–149.2° C.

Example 14

Fifty grams of crude fish cholesterol were dissolved into approximately 150 cc. of 3A alcohol containing 2.0 grams (1.0%) of KOH. The material was then treated in the usual manner. The resultant cholesterol was white to slightly yellow, stable in alcohol, soluble in ether and had a M. P. of 148.0°–149.2° C.

Example 15

110 pounds of cholesterol were crystallized from an alcoholic-potassium hydroxide solution and centrifuged. The cholesterol was washed three times with a combined total of 17 gallons of 3A alcohol. The water wash was omitted. The resultant cholesterol was insoluble in both ether and in chloroform. This cholesterol was then returned to the centrifuge and washed with 75 gallons of cold tap water. The resultant cholesterol was soluble in ether, chloroform, alcohol, acetic acid, and stable in alcohol. The melting point was within the proper range.

Example 16

110 pounds of cholesterol were crystallized from an alcoholic-potassium hydroxide solution. The cholesterol was then washed with 100 gallons of cold tap water. The resultant cholesterol was insoluble in ether and in chloroform.

Example 17

100 pounds of fresh spinal cord were hashed and extracted by agitating for about 2 hours with about 30 gallons of ethylene dichloride. The mixture was allowed to stand for 30 minutes and then the ethylene dichloride layer was drawn off. The tissue residue was extracted with about 20 gallons of ethylene dichloride in the same manner and the extract drawn off as above. This was again repeated with about the same quantity of ethylene dichloride. The 3 extracts were then combined and agitated with 5 pounds of decolorizing carbon, and the clarifying agent was removed by filtration. The filtrate was then concentrated by evaporation to a volume of about 3 gallons and the hot concentrated filtrate was allowed to cool, whereupon crude crystalline cholesterol separated. The crude cholesterol was separated from the ethylene dichloride by filtration, and this was dissolved in a quantity of 3A alcohol containing potassium hydroxide. Cholesterol was crystallized from the alcoholic-potassium hydroxide solution and separated from the solution by centrifuging. The cholesterol was washed with 3A alcohol and then with cold tap water. The resultant cholesterol had a melting point of 149.0°–149.3° C., was soluble in ether, chloroform, acetic acid, and alcohol, and was stable in alcohol.

The foregoing specific examples and detailed description have been given for the purpose of illustration only, and it is understood that my invention may be practiced in greatly different ways using any one of many varied procedures, all within the spirit of the invention.

I claim:

1. In a process for preparing cholesterol, the steps of dissolving crude cholesterol in an alkali metal hydroxide solution containing at least 85% by volume of alcohol, crystallizing cholesterol from the solution thus formed, and separating said crystallized cholesterol.

2. In a process for preparing cholesterol, the steps of dissolving crude cholesterol in an alkali metal hydroxide solution containing at least 85% by volume of alcohol, crystallizing cholesterol from the solution thus formed, separating said crystallized cholesterol, and washing it with separate portions of alcohol and water.

3. In a process for preparing cholesterol, the steps of mixing crude cholesterol with an alkali metal hydroxide solution containing at least 85% by volume of alcohol, heating the resulting mixture to dissolve the cholesterol, crystallizing cholesterol from the solution thus formed, separating said crystallized cholesterol, and washing it with separate portions of water and alcohol.

4. In a process for preparing cholesterol, the steps of mixing crude cholesterol with an alkali metal hydroxide solution containing at least 85% by volume of alcohol, heating the resulting mixture until a temperature slightly below the boiling point of said solution is reached, crystallizing cholesterol from the solution thus formed, separating said crystallized cholesterol, and washing it with separate portions of water and alcohol.

5. In a process for preparing cholesterol, the steps of dissolving crude cholesterol in a solution containing from 0.1% to 10% by weight of an alkali metal hydroxide and at least 85% by volume of alcohol, crystallizing cholesterol from the solution thus formed, separating said crystallized cholesterol, and washing it with separate portions of water and alcohol.

6. In a process for preparing cholesterol, the steps of dissolving cholesterol in an alkali metal hydroxide solution containing at least 85% by volume of an alcohol having 1 to 4 carbon atoms, crystallizing cholesterol from the solution thus formed, separating said crystallized cholesterol, and washing it with separate portions of water and alcohol.

7. In a process for preparing cholesterol, the steps of mixing crude cholesterol with an alkali metal hydroxide solution containing at least 85% by volume of alcohol, heating the resulting mixture to dissolve the cholesterol, chilling the solution thus formed to crystallize cholesterol therefrom, separating said crystallized cholesterol, and washing it with separate portions of water and alcohol.

8. The process as in claim 1 wherein the alkali metal hydroxide is potassium hydroxide.

9. The process as in claim 1 wherein the alkali metal hydroxide is sodium hydroxide.

10. The process as in claim 1 wherein the alkali metal hydroxide is lithium hydroxide.

11. In a process for preparing cholesterol, the steps of mixing crude cholesterol with a solution containing 1.0% by weight of potassium hydroxide and about 95% by volume of ethyl alcohol, heating the resulting mixture to dissolve the cholesterol, filtering while still hot the solution thus formed, chilling the filtrate to crystallize cholesterol therefrom, separating said crystallized cholesterol, and washing it with separate portions of water and alcohol.

12. A process for preparing cholesterol which comprises mixing the ethylene dichloride soluble constituents of animal nerve tissue with an alkali metal hydroxide solution containing at least 85% by volume of alcohol, heating the resulting mixture to dissolve substantially all said constituents, filtering the resulting solution while still in heated condition, chilling the filtrate to crystallize cholesterol therefrom, separating said crystallized cholesterol, and washing it with separate portions of water and alcohol.

LA VERNE VAN NESS.

References Cited in the file of this patent

UNITED STATES PATENTS

| Number | Name | Date |
|---|---|---|
| 1,912,440 | Frey | June 6, 1933 |
| 2,280,815 | Fernholz | Apr. 28, 1942 |
| 2,371,467 | Porsche | Mar. 13, 1945 |